(12) United States Patent  
Cashman

(10) Patent No.: US 8,694,825 B2  
(45) Date of Patent: Apr. 8, 2014

(54) PROTECTING STORAGE FABRICS FROM ERRANT DEVICE CAUSING SINGLE POINT OF FAILURE

(75) Inventor: Paul N. Cashman, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 13/187,051

(22) Filed: Jul. 20, 2011

(65) Prior Publication Data

US 2013/0024732 A1    Jan. 24, 2013

(51) Int. Cl.
G06F 11/00    (2006.01)

(52) U.S. Cl.
USPC ............................ 714/6.21; 714/42; 714/54

(58) Field of Classification Search
USPC ........................ 714/6.21, 42, 43, 49, 50, 51, 54
See application file for complete search history.

(56) References Cited

U.S. PATENT DOCUMENTS

| | | | |
|---|---|---|---|
| 6,571,355 | B1 | 5/2003 | Linnell |
| 6,952,734 | B1 * | 10/2005 | Gunlock et al. ............ 709/227 |
| 7,167,912 | B1 | 1/2007 | Dhingra |
| 7,228,458 | B1 * | 6/2007 | Kesavan ...................... 714/41 |
| 7,565,566 | B2 | 7/2009 | Davies et al. |
| 7,596,616 | B2 | 9/2009 | Yamamoto et al. |
| 7,779,137 | B1 | 8/2010 | Bali |
| 2003/0014693 | A1 * | 1/2003 | Goodman et al. ............ 714/31 |
| 2006/0026471 | A1 * | 2/2006 | Kubota et al. ............... 714/724 |
| 2006/0146698 | A1 * | 7/2006 | Ukrainetz et al. ........... 370/221 |
| 2011/0179310 | A1 * | 7/2011 | Fujigaya ........................ 714/42 |
| 2011/0191641 | A1 * | 8/2011 | Tashima ........................ 714/54 |
| 2011/0283150 | A1 * | 11/2011 | Konishi et al. ................ 714/42 |

OTHER PUBLICATIONS

Jackson, Mike, "SAS Storage Architecture Serial Attached SCSI", MindShare Technology Series, http://www.mindshare.com/files/ebooks/SAS%20Storage%20Architecture.pdf, accessed Apr. 11, 2011, 146 pages (Internet file protected, reference provided on DVD disk).

"Seven Reasons SAS Will Be the New Enterprise Storage Standard", 2006 Infortrend Corporation, 9 pages.

"Technical Brief: Adaptive Networking-Advanced Data Center Fabric Technology", Dell Corporation, http://www.dell.com/downloads/global/products/pvaul/en/dcf_adaptive_networking.pdf, printed Mar. 30, 2011, 19 pages.

Locke, Kyle, "Designing FPGA based 10G applications using Serial RapidIO", Xilinx Inc., ATCA Summit: Special Open Tutorial on RapidIO, printed Mar. 30, 2011, 33 pages.

* cited by examiner

Primary Examiner — Marc Duncan
(74) Attorney, Agent, or Firm — Stephen R. Tkacs; Stephen J. Walder, Jr.; Randall J. Bluestone

(57) ABSTRACT

A mechanism is provided for protecting storage fabrics from an errant device causing a single point of failure. The mechanism identifies a source of the out-of-context traffic, isolates the TAG to prevent further catastrophe, and ensures that device isolation control operations are processed timely allowing device isolation and removing the source of the issue. Should device isolation not solve the issue, the mechanism allows the host to use a binary search method to isolate the device that may be hiding its true identity and sourcing possibly malicious traffic.

20 Claims, 3 Drawing Sheets

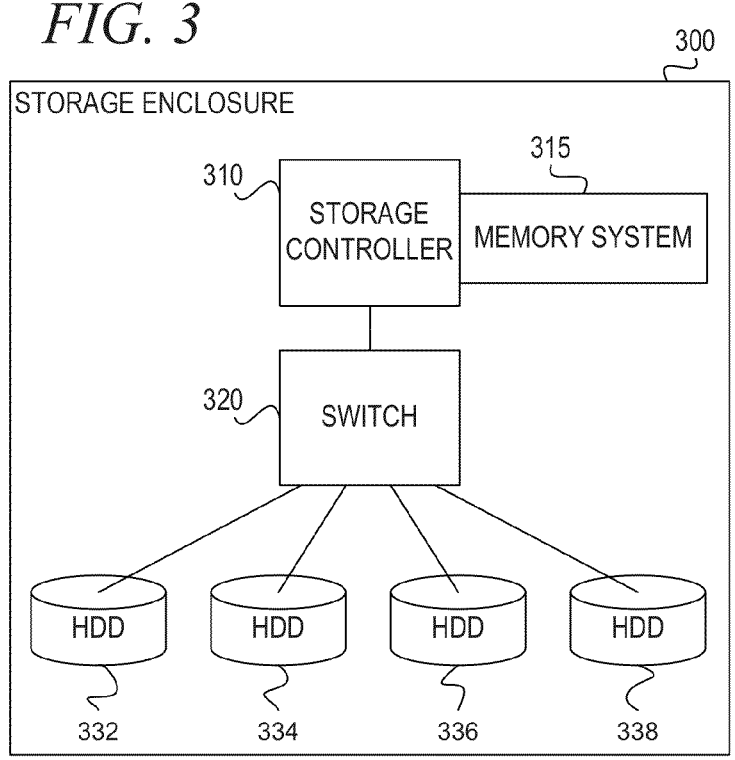
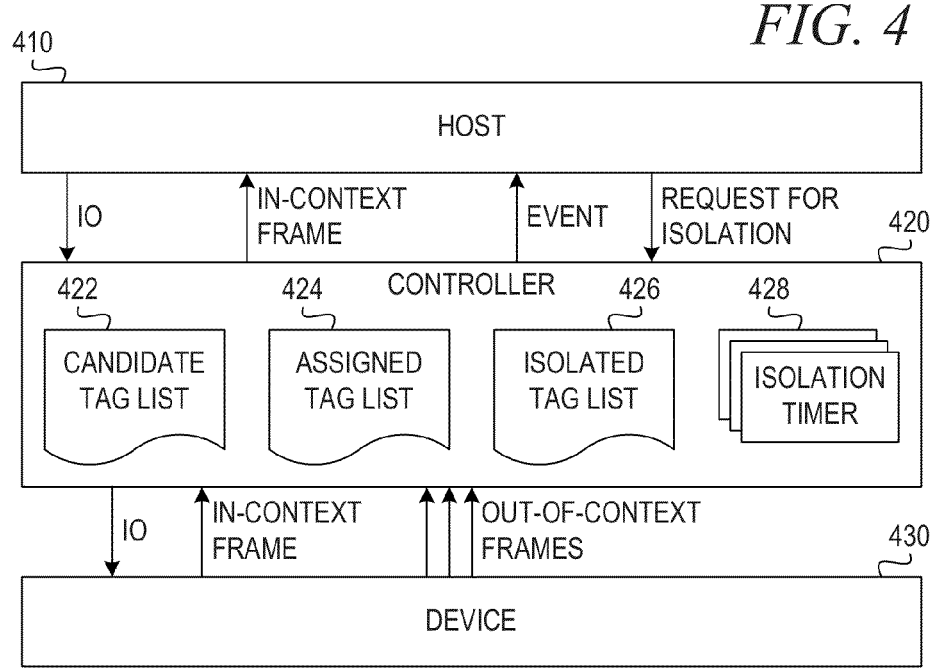

PROTECTING STORAGE FABRICS FROM ERRANT DEVICE CAUSING SINGLE POINT OF FAILURE

BACKGROUND

The present application relates generally to an improved data processing apparatus and method and more specifically to mechanisms for protecting storage fabrics from an errant device causing a single point of failure.

A storage area network (SAN) is a network of storage disks. In large enterprises, a SAN connects multiple servers, or hosts, to a centralized pool of disk storage. Compared to managing hundreds of servers, each with its own disks, a SAN improves system administration. By treating all the company's storage as a single resource, disk maintenance and routine backups are easier to schedule and control. In some SANs, the disks themselves can copy data to other disks for backup without any processing overhead at the host computers.

A storage system may lead to a single point of failure (SPOF) when an errant device floods the sub-system's communication channels with traffic that is unsolicited and out of protocol. A device may send traffic that the initiating device is not expecting. For example, in a Serial Attached SCSI (SAS) fabric, an initiator may send IO to a device, which then completes normally. The device may enter an error condition and, as a result, issue repeated SAS Response frames for the already completed IO. The controller may experience a variety of problems.

It is extremely likely that a controller will simply ignore such a frame, which on the surface seems an adequate response. Devices that issue many repeated frames cause the controller to spend significant operational resources to detect an "out of context" frame, disregard the frame, and also ensure that such a frame has no knock-on consequences, such as a device not doing its normal job or indicating that a job is done when the job is not done.

For example, due to hardware assist, there are known issues in this regard in current products. At some point, the controller may wish to re-use the protocol supplied TAG that matches the one from the errant device. A TAG is a unique identifier (ID) for an operation. This identifier is part of the protocol. There are a limited number of TAGs, so they must be re-used. The controller is at liberty to do this because the TAG has been successfully responded to. Receiving the errant response frame after re-using the TAG causes further issues with the controlling device, which may end up with hardware possibly in an invalid state. This ultimately could lead to a system catastrophe.

The controller is unable to dedicate enough resources to progress operations in a timely fashion and has no method of isolating the device at all. With dual-ported devices, an errant device could potentially fail on both SAS fabrics.

Thus, an errant device issuing out-of-context, or even malicious, traffic may cause grief for a controlling device. Such a situation may lead to IO error and potential Denial of Service both at the SAS level and also at the controller level, as the controller is spending resources dealing with the SAS bombardment such that those resources do not contribute to normal service.

SUMMARY

In one illustrative embodiment, a method is provided in a controlling device in a storage fabric for protecting the storage fabric from an errant device causing a single point of failure. The method comprises responsive to receiving from a failing device an out-of-context frame at the controlling device, identifying a TAG identifier associated with the out-of-context frame. The method further comprises removing, by the controlling device, the TAG identifier as a candidate for reuse. The method further comprises starting, by the controlling device, an isolation timer associated with the TAG identifier. The method further comprises responsive to expiration of the isolation timer, returning, by the controlling device, the TAG identifier as a candidate for reuse.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram depicting an exemplary storage enclosure in accordance with an illustrative embodiment;

FIG. 4 illustrates a mechanism for protecting storage fabrics from an errant device causing a single point of failure in accordance with an illustrative embodiment;

DETAILED DESCRIPTION

The illustrative embodiments provide a mechanism in a controller for protecting storage fabrics from an errant device causing a single point of failure. The mechanism identifies a source of the out-of-context traffic, isolates the TAG to prevent further catastrophe, and ensures that device isolation control operations are processed timely allowing device isolation and removing the source of the issue. Should device isolation not solve the issue, the mechanism allows the host to use a binary search method to isolate the device that may be hiding its true identity and sourcing possibly malicious traffic.

Figure 1:
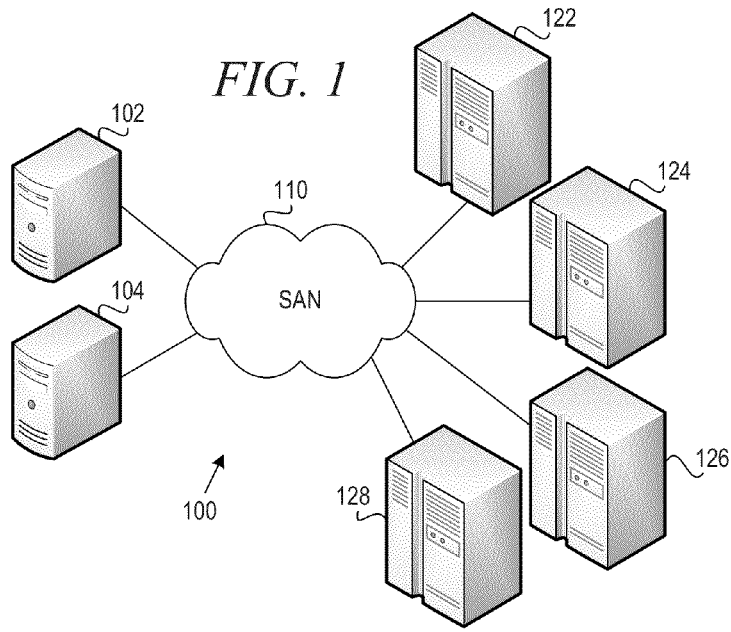
FIG. 1 depicts a pictorial representation of an exemplary distributed data processing system in which aspects of the illustrative embodiments may be implemented.
Figure 2:
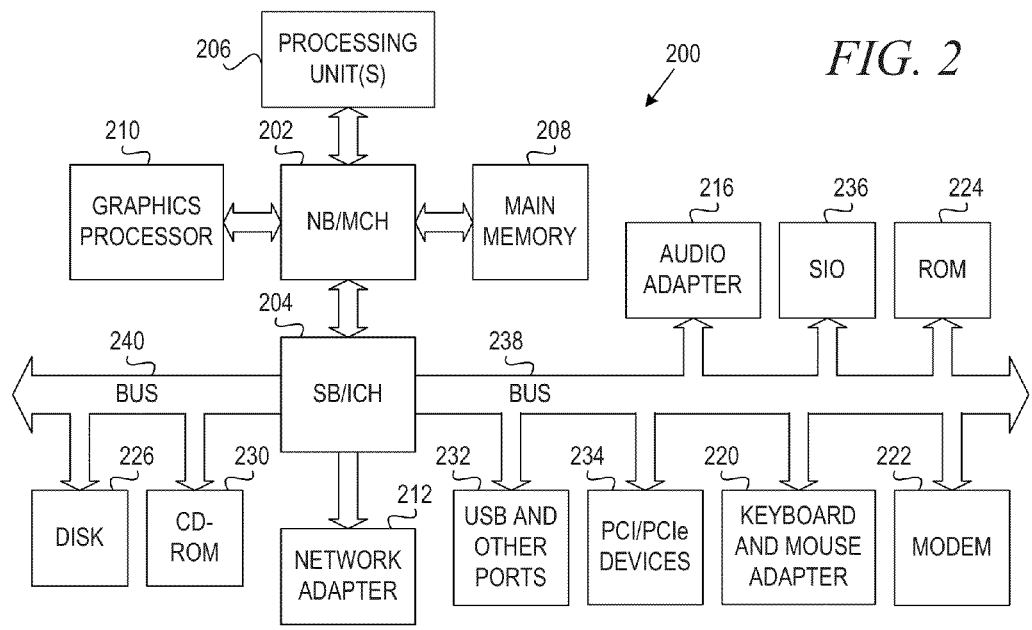
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as exemplary environments in which exemplary aspects of the illustrative embodiments may be implemented. While the description following FIGS. 1-3 will focus primarily on a storage enclosure implementation, this is only exemplary and is not intended to state or imply any limitation with regard to the features of the present invention.

With reference now to the figures and in particular with reference to FIGS. 1-3, exemplary diagrams of data processing environments are provided in which illustrative embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one storage area network 110, which is the medium used to provide communication links between various devices and computers, such as host computers and storage enclosures, connected together within distributed data processing system 100. Storage area network 110 may include connections, such as wire, wireless communication links, serial attached small computer systems interface (serial attached SCSI or SAS) switches, or fiber optic cables.

In the depicted example, host computer 102 and host computer 104 are connected to storage area network (SAN) 110 along with storage enclosures 122, 124, 126, and 128. A storage enclosure includes a storage controller and connection to one or more hard disk drives. The storage controller may be a simple controller for storing data to the hard disk drives, or alternatively may include a redundant array of independent disks (RAID) controller. Distributed data processing system 100 may include additional hosts, storage enclosures, clients, and other devices not shown.

In the depicted example, SAN 110 may use the Transmission Control Protocol/Internet Protocol (TCP/IP) suite of protocols to communicate with one another; however, more likely, SAN 110 may use a protocol associated with Fibre Channel (FC) or Serial attached SCSI (SAS). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as host 102 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 12 of FIG. 2, may include one or more devices used to transmit and receive data. A memory may be, for example, main memory 208, ROM 224, or a cache such as found in NB/MCH 202 in FIG. 2.

Moreover, data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 is a block diagram depicting an exemplary storage enclosure in accordance with an illustrative embodiment. Storage enclosure 300 comprises storage controller 310, which may be a redundant array of independent disks (RAID) controller or a non-RAID controller. Storage controller 310 communicates with hard disk drives (HDDs) 332, 334, 336, and 338 through switch 320. Switch 320 may be, for example, a serial attached SCSI (SAS) switch. Other devices in a storage area network (SAN) may write data to or read data from storage enclosure 300 by connection to switch 320.

Storage controller 310 may store data temporarily in memory system 315 before persisting the data to HDDs 332-338. Memory system 315 may comprise a Double Data Rate (DDR) memory system that provides fast access speeds to meet required maximum throughput to HDDs 332-338. DDR memory is a volatile memory.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

An errant device, such as one of hard disk drives 332-338 issuing out-of-context, or even malicious, traffic may cause performance issues for a controlling device, such as storage controller 310. Such a situation may lead to IO error and potential Denial of Service both at the SAS level and also at the controller level, as the controller is spending resources dealing with the SAS bombardment such that those resources do not contribute to normal service.

FIG. 4 illustrates a mechanism for protecting storage fabrics from an errant device causing a single point of failure in accordance with an illustrative embodiment. The mechanism identifies the source of out-of-context traffic, isolates the TAG to prevent further catastrophe, and ensures that device isolation control operations are processed timely allowing device isolation, thus removing the source of the issue. If isolating the TAG of the device does not resolve the issue, the host uses a binary search method to isolate the device, which may be hiding its identity and sourcing malicious traffic.

Host 410 sends IO to device 430 via controller 420. Controller 420 forwards the IO to device 430, which returns an in-context frame. Controller 420 forwards the in-context frame to host 410. If device 430 is errant, device 430 may send out-of-context frames to host 410.

Controller 420 stores a candidate TAG list 422, which lists a limited number of unique identifiers for an operation. This set of unique identifiers is part of the SAS protocol and is used to identify operations. When host 410 initiates an IO operation, controller 420 assigns a TAG from candidate TAG list 422 to the operation and moves that TAG from candidate TAG list 422 to assigned TAG list 424. When device 430 responds to the IO operation with a frame having the assigned TAG, controller 420 returns the TAG from assigned TAG list 424 to candidate TAG list 422.

In accordance with an illustrative embodiment, controller 420 detects unsolicited, out-of-context frames. Controller 420 identifies the TAG associated with the out-of-context frame and puts the TAG into isolation. The controller marks the TAG as unusable and removes the TAG as a candidate for re-use. In the depicted example, controller recognizes a frame as being out-of-context when the frame has a TAG that is not in assigned TAG list 424.

If the TAG of an out-of-context frame is in candidate list 422, controller 420 moves the TAG from candidate TAG list 422 to isolated TAG list 426. The controller starts an isolation timer 428. The controller 420 cannot use the TAG until the isolation timer elapses. If the TAG is already in isolation, controller 420 restarts the isolation counter associated with the TAG.

Each TAG in isolated TAG list 426 has an associated isolation timer 428. The controller 420 may initialize each isolation timer 428 with a predetermined time value, and controller 420 may decrement each isolation timer 428 until it reaches zero. Alternatively, controller 420 may initialize each timer 428 to zero and advance each timer 428 until it reaches a predetermined time value. If the TAG of an out-of-context frame is already in isolate TAG list 426, controller 420 restarts the corresponding isolation timer 428.

The depicted example shows three separate TAG lists for candidate TAGs 422, assigned TAGs 424, and isolated TAGs 426. In an alternative embodiment, controller 420 may keep track of TAGs in a single data structure. For example, controller 420 may maintain a TAG table (not shown). Each entry of the TAG table may identify the TAG and include flags to mark the TAG as candidate, assigned, or isolated. Each entry of the TAG table may also include a reference to an isolation timer if the TAG is in isolation.

Controller 420 has an interface (not shown) by which it informs host 410 that an out-of-context frame has been received from device 430. Controller 420 may inform host 410 of such an event on the first occurrence and not on repeats. Controller 420 may send an event notification including an identification of the source advertised in the out-of-context frame.

Controller 420 also dedicates internal processing resources to respond to urgent requests from host 410 in order for host 410 to isolate what it believes to be the failing device. Host 410 may isolate the device by zoning it off and turning off the link. This may be a solution for a Denial of Service that may occur in this scenario. At this point, the scenario may be resolved if the device is identified and isolated successfully. This solution may also cope with multiple failures of the same nature at the same time.

In one example embodiment, if the device is lying about its identity by spoofing its fabric address, for example, host 410 may detect that the issue is repeating despite having isolated the supposed failing device. Responsive to receiving an out-of-context notification for a device that supposedly was isolated, host 410 may use a binary search technique, which is used in storage fabrics for other purposes, to isolate the faulty device.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
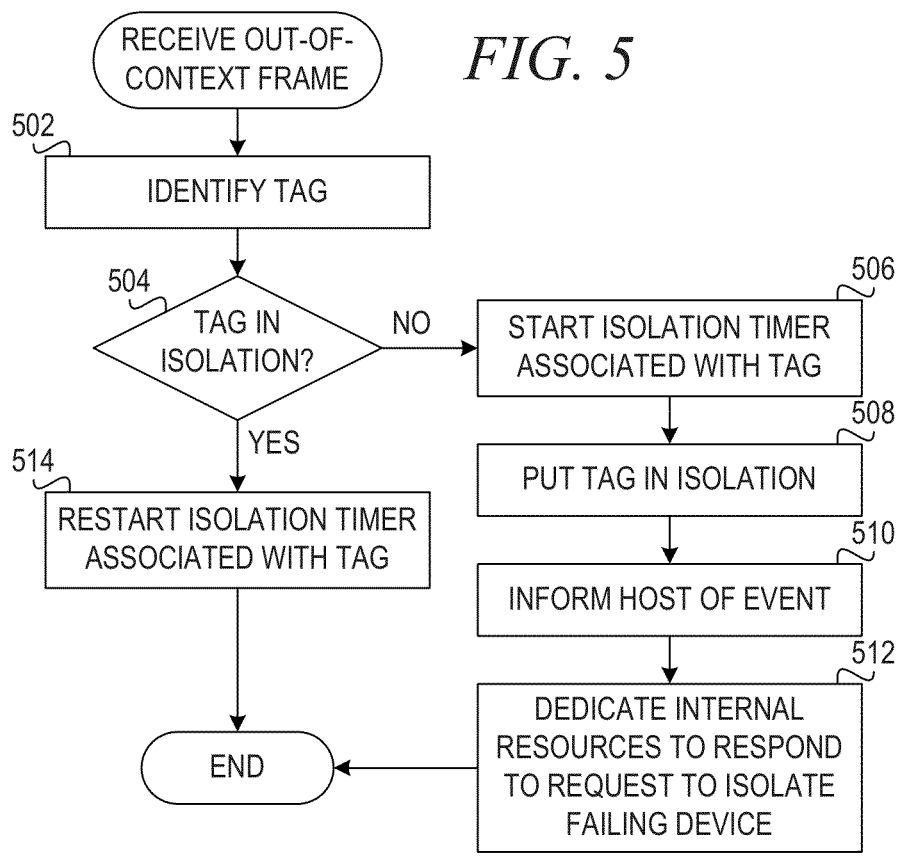
FIG. 5 is a flowchart illustrating operation of a controlling device for protecting storage fabrics from an errant device causing a single point of failure in accordance with an illustrative embodiment.

FIG. 5 is a flowchart illustrating operation of a controlling device for protecting storage fabrics from an errant device causing a single point of failure in accordance with an illustrative embodiment. Operation begins when the controlling device receives an out-of-context frame. The controlling device identifies a TAG associated with the out-of-context frame (block 502). The controlling device determines whether the TAG is already in isolation (block 504).

If the TAG is not already in isolation, the controlling device starts an isolation tinier associated with the TAG (block 506). The controlling device puts the TAG in isolation, removing it as a candidate for reuse (block 508). The controlling device then informs the host that initiated the IO operation associated with the TAG of the event (block 510). The controlling device also dedicates internal resources to respond to a request from the host to isolate the failing device (block 512). Thereafter, operation ends.

If the TAG is already in isolation in block 504, the controlling device restarts the isolation timer associated with the TAG (block 514). Thereafter, operation ends. While not shown in the flowchart of FIG. 5, if an isolation timer associated with an isolated TAG expires, the controlling device returns the TAG to the candidate list.

Figure 6:
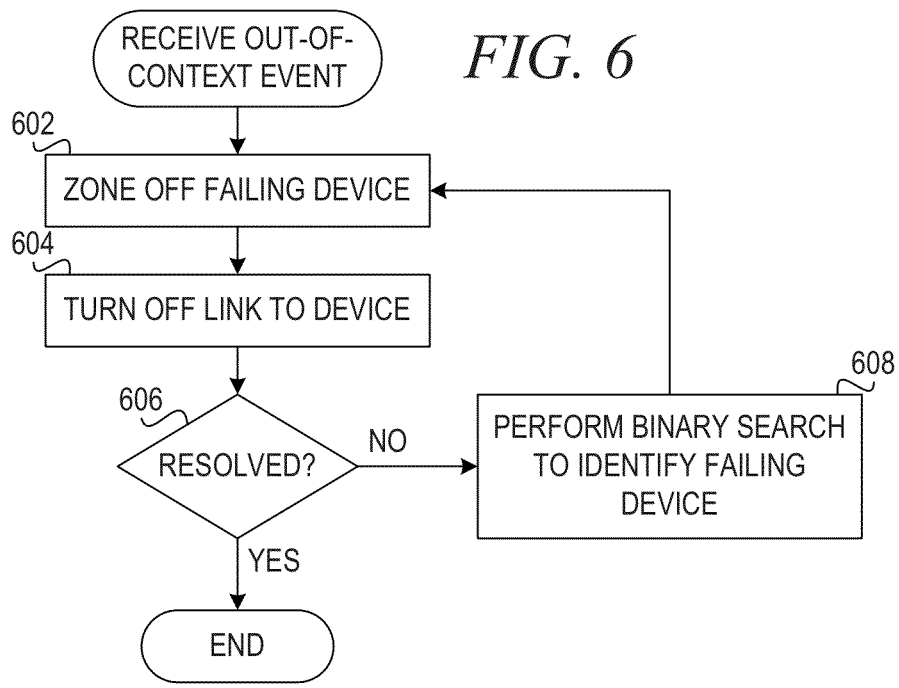
FIG. 6 is a flowchart illustrating operation of a host device for protecting storage fabrics from an errant device causing a single point of failure in accordance with an illustrative embodiment.

FIG. 6 is a flowchart illustrating operation of a host device for protecting storage fabrics from an errant device causing a single point of failure in accordance with an illustrative embodiment. Operation begins when the host device receives notification of an out-of-context frame event. The host device zones off the failing device (block 602) and turns off the link to the device in the SAS fabric (block 604). Then, the host device determines whether the issue is resolved (block 606). The host device may determine that the issue is resolved if it does not receive another out-of-context frame event for the same TAG within a predetermined time period, for example.

If the host device determines that the issue is resolved, then operation ends. The host device may determine that the issue is not resolved if the device is lying about its identity by spoofing its fabric address, for example. In this case, the host device will not have isolated the device successfully. If the host device determines that the issue is not resolved in block 606, the host device may perform a binary search to identify the failing device (block 608). Operation then returns to block 602 to isolate the identified device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for protecting storage fabrics from an errant device causing a single point of failure. The mechanism identifies a source of the out-of-context traffic, isolates the TAG to prevent further catastrophe, and ensures that device isolation control operations are processed timely allowing device isolation and removing the source of the issue. Should device isolation not solve the issue, the mechanism allows the host to use a binary search method to isolate the device that may be hiding its true identity and sourcing possibly malicious traffic.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a controlling device in a storage fabric, for protecting the storage fabric from an errant device causing a single point of failure, the method comprising:
responsive to receiving from a failing device an out-of-context frame at the controlling device, identifying a TAG identifier associated with the out-of-context frame;
removing, by the controlling device, the TAG identifier as a candidate for reuse;
starting, by the controlling device, an isolation timer associated with the TAG identifier; and
responsive to expiration of the isolation timer, returning, by the controlling device, the TAG identifier as a candidate for reuse.

2. The method of claim 1, further comprising:
notifying a host device that initiated an IO operation associated with the TAG identifier of an out-of-context frame event associated with the TAG identifier.

3. The method of claim 2, further comprising:
dedicating, by the controlling device, internal resources to respond to a request from the host device to isolate the failing device from the storage fabric.

4. The method of claim 3, wherein the host device isolates the failing device by zoning off the failing device and turning off a link to the failing device.

5. The method of claim 3, wherein responsive to the host device receiving a subsequent out-of-context frame event associated with the failing device, the host device performs a binary search to identify the failing device.

6. The method of claim 1, further comprising:
responsive to receiving a subsequent out-of-context frame at the controlling device in a storage fabric, identifying a TAG identifier associated with the subsequent out-of-context frame; and
responsive to the TAG identifier associated with the subsequent out-of-context frame already being removed as a candidate for reuse, restarting an isolation timer associated with the TAG identifier associated with the subsequent out-of-context frame.

7. A computer program product comprising a non-transitory computer readable storage medium having a computer readable program stored therein, wherein the computer readable program, when executed on a computing device, causes the computing device to:
responsive to receiving from a failing device an out-of-context frame, identifying a TAG identifier associated with the out-of-context frame;
removing the TAG identifier as a candidate for reuse;
starting an isolation timer associated with the TAG identifier; and
responsive to expiration of the isolation timer, returning the TAG identifier as a candidate for reuse.

8. The computer program product of claim 7, wherein the computer readable program further causes the computing device to:
notifying a host device that initiated an IO operation associated with the TAG identifier of an out-of-context frame event associated with the TAG identifier.

9. The computer program product of claim 8, wherein the computer readable program further causes the computing device to:
dedicating, by the controlling device, internal resources to respond to a request from the host device to isolate the failing device from the storage fabric.

10. The computer program product of claim 9, wherein the host device isolates the failing device by zoning off the failing device and turning off a link to the failing device.

11. The computer program product of claim 9, wherein responsive to the host device receiving a subsequent out-of-context frame event associated with the failing device, the host device performs a binary search to identify the failing device.

12. The computer program product of claim 7, wherein the computer readable program further causes the computing device to:
   responsive to receiving a subsequent out-of-context frame at the controlling device in a storage fabric, identifying a TAG identifier associated with the subsequent out-of-context frame; and
   responsive to the TAG identifier associated with the subsequent out-of-context frame already being removed as a candidate for reuse, restarting an isolation timer associated with the TAG identifier associated with the subsequent out-of-context frame.

13. The computer program product of claim 7, wherein the computer readable program is stored in a computer readable storage medium in a data processing system and wherein the computer readable program was downloaded over a network from a remote data processing system.

14. The computer program product of claim 7, wherein the computer readable program is stored in a computer readable storage medium in a server data processing system and wherein the computer readable program is downloaded over a network to a remote data processing system for use in a computer readable storage medium with the remote system.

15. An apparatus, comprising:
   a processor; and
   a memory coupled to the processor, wherein the memory comprises instructions which, when executed by the processor, cause the processor to:
      responsive to receiving from a failing device an out-of-context frame, identifying a TAG identifier associated with the out-of-context frame;
      removing the TAG identifier as a candidate for reuse;
      starting an isolation timer associated with the TAG identifier; and
      responsive to expiration of the isolation timer, returning the TAG identifier as a candidate for reuse.

16. The apparatus of claim 15, wherein instructions further cause the processor to:
   notifying a host device that initiated an IO operation associated with the TAG identifier of an out-of-context frame event associated with the TAG identifier.

17. The apparatus of claim 16, wherein instructions further cause the processor to:
   dedicating, by the controlling device, internal resources to respond to a request from the host device to isolate the failing device from the storage fabric.

18. The apparatus of claim 17, wherein the host device isolates the failing device by zoning off the failing device and turning off a link to the failing device.

19. The apparatus of claim 17, wherein responsive to the host device receiving a subsequent out-of-context frame event associated with the failing device, the host device performs a binary search to identify the failing device.

20. The apparatus of claim 15, wherein instructions further cause the processor to:
   responsive to receiving a subsequent out-of-context frame at the controlling device in a storage fabric, identifying a TAG identifier associated with the subsequent out-of-context frame; and
   responsive to the TAG identifier associated with the subsequent out-of-context frame already being removed as a candidate for reuse, restarting an isolation timer associated with the TAG identifier associated with the subsequent out-of-context frame.

* * * * *